(No Model.)

H. S. NEWBERRY.
WATER SEALED INK WELL.

No. 497,889. Patented May 23, 1893.

WITNESSES:
M. J. Wilson
W. H. Burridge

INVENTOR:
H. S. Newberry
By W. H. Burridge
Atty.

United States Patent Office.

HENRY S. NEWBERRY, OF CLEVELAND, OHIO.

WATER-SEALED INK-WELL.

SPECIFICATION forming part of Letters Patent No. 497,889, dated May 23, 1893.

Application filed February 2, 1893. Serial No. 460,807. (No model.)

*To all whom it may concern:*

Be it known that I, HENRY S. NEWBERRY, a citizen of the United States, residing at Cleveland, in the county of Cuyahoga and State of Ohio, have invented a certain new and useful Water-Sealed Ink-Well or Inkstand, of which the following is a full, clear, and exact description.

My invention consists of a water-chamber and a well so arranged that, by turning down said well, the fluid therein will rise, to recede again when the well is turned up.

The object of my improvement is to provide a coverless ink-stand in which the ink, when not in use, is protected from dust and the action of the atmosphere and when in use presents a convenient depth, to obviate the liability of getting more or less writing-fluid upon the pen than is desired.

In connection with the construction of my improved water-sealed ink-well or ink-stand, I have made use of a law of physics whereby the displacement upward of a quantity of water, in the water-chamber, against a body of air forces said air into the ink receptacle, no other exit being provided, and displaces the fluid contained in said receptacle causing said fluid to rise in the neck thereof.

That my invention may be seen and fully understood by others reference will be had to the following specification and annexed drawings, forming a part thereof, in which—

Figure 1:
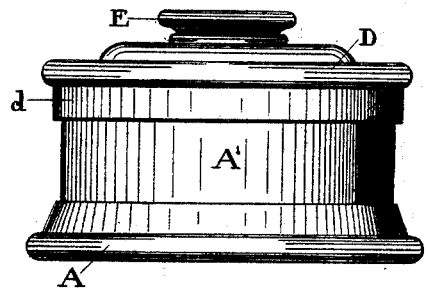
Figure 2:
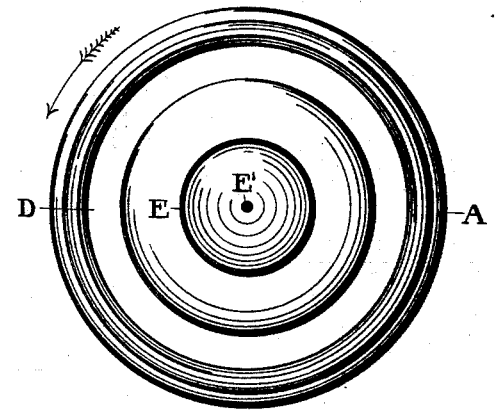
Figure 3:
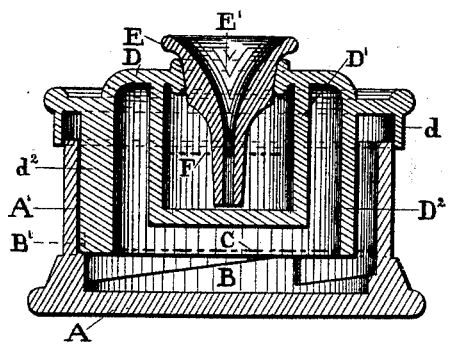
Figure 4:
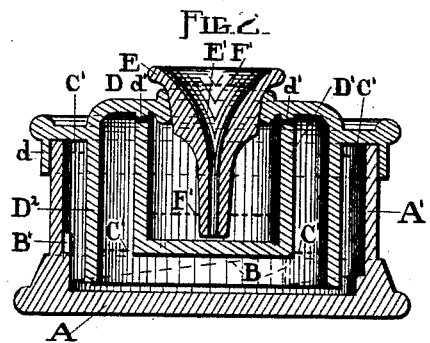
Figure 5:
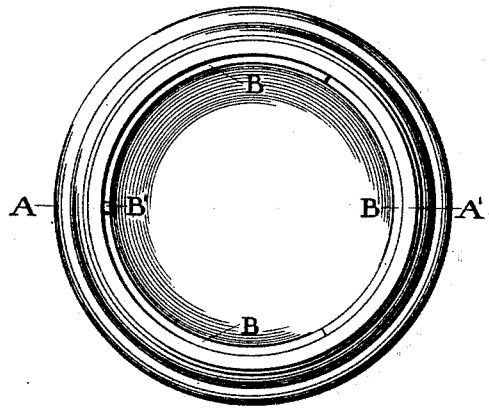

Figure 1 is a side view of my ink-stand; Fig. 2, a top view; Fig. 3, a vertical section showing the well elevated; Fig. 4, a vertical section showing the well depressed; Fig. 5, a top view of the water-chamber, and Fig. 6, a view of the well from the under side.

Similar letters of reference designate like parts in the drawings and specification.

The water-chamber A has three or more inclined planes B, encircling the interior thereof, at the base of the annular wall A', as shown in Figs. 1, 4 and 5. Arising from the highest point of one of the planes B is the stop B', Figs. 3, 4 and 5.

When ready for use the chamber A is filled with water to a little above the most elevated portions of the inclined planes B, as indicated by the dotted line C, Fig. 3.

Figure 6:
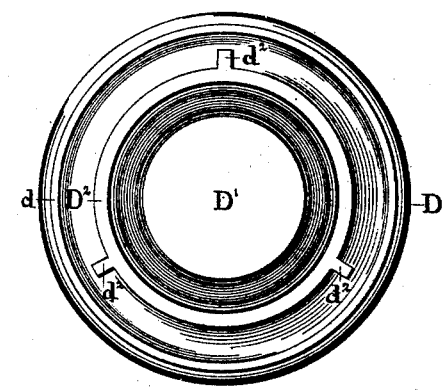

The well D consists of the depending ink receptacle D', Figs. 3, 4 and 6, and the cylindrical air-chamber $D^2$ and is provided with the outside flange $d$ which encircles the top of the annular wall A', of the water-chamber A. In the top of the well D is an opening which receives the neck E of essentially the form shown in Figs. 1, 2, 3 and 4, said neck having the funnel-shaped passage E' therein, small at the base and flaring at the top. The base of the neck E extends nearly to the bottom of the ink receptacle D' and said receptacle is provided, near the top, with one or more air holes $d'$, Fig. 4.

The dotted line F, Fig. 3, indicates the height of the ink, ordinarily, in the receptacle D' and it will be readily seen that only the small amount of said ink contained in the contracted or narrow portion of the neck E is exposed.

On the exterior of the air-chamber $D^2$ are the ribs $d^2$, Figs. 3 and 6, corresponding to the number of inclined planes B, in the water-chamber A. The ribs $d^2$ support the well D upon the inclined planes B, said well being shown in its highest position, in Fig. 3, the bottom of the ribs resting upon the most elevated points of the planes and one of said ribs being in contact with the stop B'. By turning the well D in the direction of the arrow in Fig. 2, until the ribs $d^2$ come in contact with the elevated ends of the planes B said well will be in its lowest position, as indicated in Fig. 4. The elevated ends of the planes B limit the movement of the well D in one direction and the stop B' limits the movement in the opposite direction.

Assuming that the water-chamber A and the well D are in the position illustrated by Fig. 3, each containing the proper amount of fluid, as before described, and it is desired to raise the ink in the neck E, that said ink may be utilized for writing purposes, the operation will be as follows: Turn the well D in the direction of the arrow in Fig. 2, until the ribs $d^2$ encounter the elevated ends of the inclined planes B, in the water-chamber A, when the water in said chamber will be displaced by the air in air-chamber $D^2$. Since the well D and the flange $d$ do not form an air-tight joint with the wall A', of the water-chamber A, the water is permitted to rise freely between the outside of the air-chamber $D^2$ and the interior of said wall $A'$, when the well D is depressed, but the air in the chamber $D^2$ can escape only through the holes $d'$ into the receptacle D forcing the contents of said receptacle upward in the neck E and offering so much resistance to the water that it rises higher outside of the air-chamber $D^2$ than it does inside, as indicated by the dotted lines $C'$, Fig. 4. The dotted lines $F'$, Fig. 4, mark the height of the ink in the receptacle $D'$ and in the neck E when the well D is depressed to its lowest extent. By turning the well D in the direction opposite to that indicated by the arrow in Fig. 2 until one of the ribs $d^2$ encounters the stop $B'$, the water and ink will seek their former level, as in Fig. 3.

The water-chamber A and the well D are constructed of glass preferably, but metal or other suitable material may be substituted for the glass. The neck E is composed of hard-rubber, glass, or other suitable substance.

When it is desired to replenish or remove the water in the chamber A, it is only necessary to lift out the well D, and a fresh supply of ink is introduced into the receptacle $D^2$ through the passage $E'$, in the neck E, or through the opening in the top of the well D into which the neck is received, it having been first removed.

What I claim as my invention, and desire to secure by Letters Patent, is—

1. In a water-sealed ink-well, a water-chamber having a series of inclined planes encircling the base of the interior, one of said planes being provided with a stop, in combination with a well having a depending receptacle, and air-chamber provided with ribs which support said well on the inclined planes, said receptacle opening into the air-chamber through one or more small holes, and a neck inserted in the top of the well, said neck having a funnel-shaped passage connecting the interior of the receptacle with the exterior, in the manner substantially as and for the purpose set forth.

2. An ink-stand consisting of a well having a perforated ink receptacle and a ribbed air-chamber with a vertically pierced neck, and arranged in connection with a water-chamber having a series of inclined planes, whereby the ink in the receptacle, by the displacement of the inclosed air and water, rises or recedes in the neck accordingly as the well is depressed or elevated in the water-chamber, in the manner substantially as and for the purpose set forth.

In testimony whereof I affix my signature in presence of two witnesses.

HENRY S. NEWBERRY.

Witnesses:
M. J. WILSON,
W. H. BURRIDGE.